(12) United States Patent
Yang et al.

(10) Patent No.: US 8,861,120 B2
(45) Date of Patent: Oct. 14, 2014

(54) MAGNETIC MEDIUM AND WRITING AND READING METHOD

(75) Inventors: Tao Yang, Yokohama (JP); Hirofumi Suto, Tokyo (JP); Tazumi Nagasawa, Yokohama (JP); Kiwamu Kudo, Kamakura (JP); Rie Sato, Yokohama (JP); Koichi Mizushima, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 107 days.

(21) Appl. No.: 13/571,550

(22) Filed: Aug. 10, 2012

(65) Prior Publication Data

US 2013/0070361 A1 Mar. 21, 2013

(30) Foreign Application Priority Data

Sep. 21, 2011 (JP) ................. 2011-205777

(51) Int. Cl.
*G11B 5/02* (2006.01)
*G11B 5/127* (2006.01)
*G11B 5/82* (2006.01)
*G11B 5/66* (2006.01)
*G11B 5/74* (2006.01)
*G11B 5/00* (2006.01)

(52) U.S. Cl.
CPC ........ *G11B 5/746* (2013.01); *G11B 2005/0024* (2013.01); *G11B 5/82* (2013.01); *G11B 5/66* (2013.01)
USPC ......................... 360/55; 360/324.2; 428/828.1

(58) Field of Classification Search
CPC ............ G11B 5/66; G11B 5/88; G11B 5/746; G11B 2005/0024; G11B 5/3903; G11B 5/653; G11B 5/667; G11B 5/656; B82Y 10/00; H01L 43/08

USPC .................. 360/55, 324.12, 324.2, 325, 324; 428/828.1, 828; 365/158

See application file for complete search history.

(56) References Cited

U.S. PATENT DOCUMENTS 6,052,262 A * 4/2000 Kamiguchi et al. ..... 360/324.12
7,601,443 B2 * 10/2009 Lim et al. .................. 428/828.1

(Continued)

FOREIGN PATENT DOCUMENTS

| JP | 07-244801 | 9/1995 |
| JP | 07-326002 | 12/1995 |
| JP | 2002-279618 | 9/2002 |
| WO | 2011030449 A1 | 3/2011 |

OTHER PUBLICATIONS

Zhu, Jian-Gang, et al., "Microwave Assisted Magnetic Recording", IEEE Transactions on Magnetics, vol. 44, No. 1, Jan. 2008.

(Continued)

*Primary Examiner* — Ali Neyzari
(74) *Attorney, Agent, or Firm* — Amin, Turocy & Watson, LLP

(57) ABSTRACT

According to one embodiment, a magnetic medium includes at least one recording layer including a first magnetic layer, a second magnetic layer and a non-magnetic layer. The first magnetic layer is form of a first magnetic material having a first magnetic anisotropy. The second magnetic layer is made of a second magnetic material having a second magnetic anisotropy different from the first magnetic anisotropy. The non-magnetic layer is made of a non-magnetic material and between the first and second magnetic layers, the first magnetic layer and the second magnetic layer being coupled such that directions of magnetization of the first and second magnetic layers are opposed to each other.

9 Claims, 6 Drawing Sheets

(56) References Cited

U.S. PATENT DOCUMENTS

| | | | |
|---|---|---|---|
| 7,613,034 B2 * | 11/2009 | Tagami et al. | 365/158 |
| 7,969,775 B2 * | 6/2011 | Khizroev | 365/173 |
| 2002/0132140 A1 | 9/2002 | Igarashi et al. | |
| 2010/0172055 A1 | 7/2010 | Khizroev | |

OTHER PUBLICATIONS

First Office Action for Japanese Patent Application No. 2011-205777 Dated Aug. 19, 2014, 5 pgs.

* cited by examiner

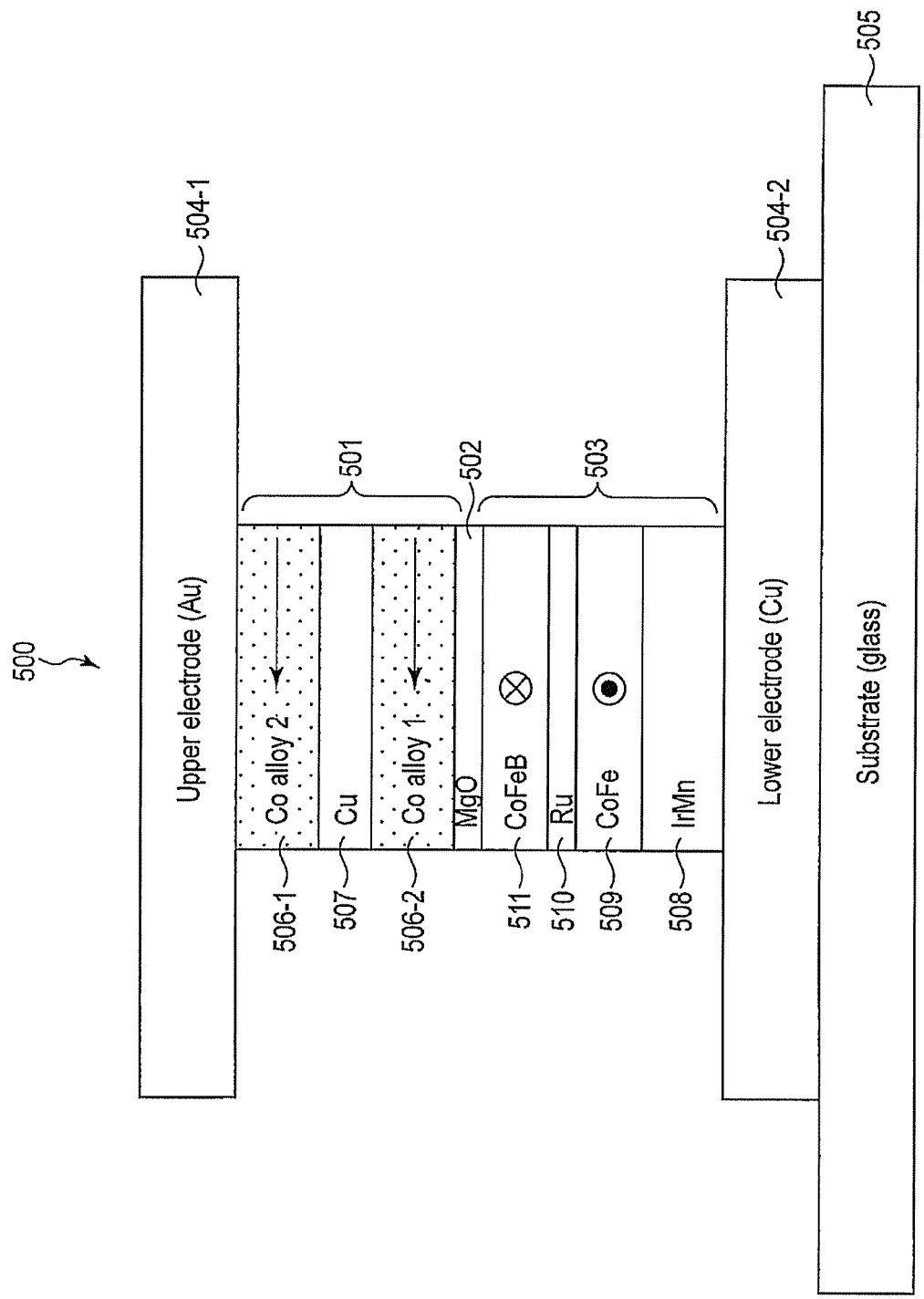
F I G. 5

MAGNETIC MEDIUM AND WRITING AND READING METHOD

CROSS-REFERENCE TO RELATED APPLICATIONS

This application is based upon and claims the benefit of priority from prior Japanese Patent Application No. 2011-205777, filed Sep. 21, 2011, the entire contents of which are incorporated herein by reference.

FIELD

Embodiments described herein relate generally to a magnetic medium and a writing and reading method.

BACKGROUND

A key Information and Communication Technology (ICT) component for realizing smart communities is environmentally friendly mass-storage technology capable of reducing energy consumption and saving space. To achieve such a capability, the storage density of magnetic recording, which is a mainstream storage technique, has been improved remarkably as a result of recent progresses in fundamental research as well as micro- and nano-fabrication technology.

Three-dimensional magnetic recording has been proposed as a way to increase magnetic storage density. In comparison with a conventional magnetic medium having only a single recording layer, a three-dimensional magnetic storage medium has multiple recording layers allowing the storage density per unit area to be increased in accordance with the number of layers. In a three-dimensional magnetic storage medium the recording layer is selected by using ferromagnetic resonance when reading or writing. Since each recording layer has a different ferromagnetic resonance frequency, a desired layer can be selected when reading or writing by applying a high-frequency magnetic field which causes ferromagnetic resonance only in the desired layer.

BRIEF DESCRIPTION OF THE DRAWINGS

FIG. 5 illustrates examples of one dot of a bit-patterned medium having the conventional recording layer and an element including a magnetic tunnel junction for measuring the ferromagnetic resonance frequency of the dot.

DETAILED DESCRIPTION

Figure 1A:
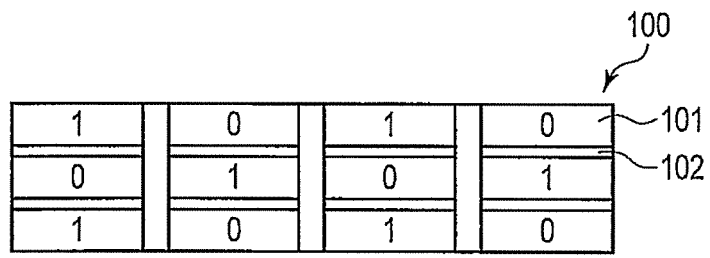
FIG. 1A illustrates an example of the magnetic medium and FIG. 1B illustrates an example of a recording layer.

Generally, data item is recorded in a magnetic medium as the direction of Magnetization. The storage density is improved by reducing the grain size of the magnetic material used for recording the bits of data item. To maintain an adequate read signal-to-noise ratio (SNR), it is necessary to make the crystal grain structure of the magnetic medium finer. However, in doing this, the thermal stability of the magnetic crystal grains may be reduced. This thermal stability is given by $K_u V/K_B T$, where $K_u$ is the magnetic anisotropic energy constant, V is the grain volume, $K_B$ is the Boltzmann constant, and T is the temperature. If there is insufficient thermal stability, the direction of magnetization may be reversed, and recorded data item may be lost because of thermal fluctuations even though at room temperature. To maintain thermal stability while making the magnetic crystal grain structure finer, the magnetic anisotropy must be increased. However, if this is done, the reversal magnetic field will be increased, and writing becomes difficult. To write easily, the microwave assisted (ferromagnetic resonance) magnetic recording method, which excites ferromagnetic resonance in the medium with a high-frequency magnetic field and reduces the reversal magnetic field, has been used.

The ferromagnetic resonance frequency, f, is given by the Kittle formula $$f = \frac{\gamma}{2\pi}\sqrt{(h_a + h_e)(h_a + h_e + 4\pi M)}, \quad (1)$$

where $\gamma$ is the gyromagnetic ratio, $h_a$ is the magnetic anisotropic field, $h_e$ is the external magnetic field, and M is the saturation magnetization. Every time surrounding bits are reversed, the external magnetic field $h_e$ changes because of the stray field, thus the ferromagnetic resonance frequency easily becomes unstable.

In writing and reading by using ferromagnetic resonance, a problem wherein the ferromagnetic resonance frequency changes because of the stray field from the surrounding bits may arise. In particular, the stray field greatly affects three-dimensional magnetic recording since the number of surroundings bits is large.

In general, according to one embodiment, a magnetic medium includes at least one recording layer, the recording layer includes a first magnetic layer, a second magnetic layer and a non-magnetic layer. The first magnetic layer is made of a first magnetic material having a first magnetic anisotropy, data item being written to the first magnetic layer in accordance with the magnetization direction. The second magnetic layer is made of a second magnetic material having a second magnetic anisotropy different from the first magnetic anisotropy. The non-magnetic layer is made of a non-magnetic material and being between the first magnetic layer and the second magnetic layer, the first magnetic layer and the second magnetic layer being coupled such that directions of magnetization of the first magnetic layer and the second magnetic layer are opposed to each other by magnetic exchange via the non-magnetic layer.

In the following, the magnetic medium and the magnetic writing and reading method according to the present embodiments will be described in detail with reference to the drawings. In the embodiment described below, units specified by the same reference number carry out the same operation, and may only be explained once.

Figure 1B:
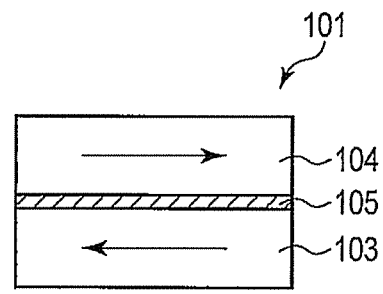

A description of the magnetic medium according to the present embodiment with reference to FIGS. 1A and 1B follows. FIG. 1A illustrates an example of the magnetic medium (cross-sectional view), and FIG. 1B illustrates an example of a recording layer (cross-sectional view).

A magnetic medium 100 according to this embodiment includes a plurality of recording layers 101 and a plurality of intermediate layers 102. The magnetic medium 100 shown in FIGS. 1A and 1B are a bit-patterned media (BPM) in which recording bits are discrete, but may be a continuous medium. This embodiment illustrates a three-dimensional magnetic recording medium having a plurality of recording layer, but may be applicable to a single layered medium. A single layered medium utilizing a microwave assisted magnetic recording includes a single recording layer 101.

The recording layer 101 is made of a magnetic material, and is capable of recording binary data item by changing the direction of magnetization.

An intermediate layer 102 is provided between two of the recording layers 101, and magnetically separates the two recording layers 101. The intermediate layer 102 may be made of a material which does not cause magnetic exchange coupling between the recording layers 101, such as Cu. FIG. 1A illustrates an example of the magnetic medium 100 having three recording layers 101 in which intermediate layers 102 are interleaved with the recording layers. However, the magnetic medium 100 may have further recording layers and intermediate layers interleaved in the same way as shown in FIG. 1A.

As shown in FIG. 1B, the recording layer 101 includes a first magnetic layer 103, a second magnetic layer 104 and a non-magnetic layer 105.

The first magnetic layer 103 is made of a material having a large magnetic anisotropy, for example, a hard magnetic material such as CoCr alloy, FePt alloy and CoPt alloy, to maintain stability of data recording. The first magnetic layer 103 maintains recorded data. In addition to the above-mentioned alloys, another material whose $K_u V/K_B T$ is 60 or more can also be used for the first magnetic layer 103.

The second magnetic layer 104 is made of a material whose magnetic anisotropy is smaller than that used for the first magnetic layer 103. For example, a soft magnetic material such as NiFe type alloy and CoFe type alloy is used. The second magnetic layer 104 functions to cancel the stray field from the first magnetic layer 103.

The non-magnetic layer 105 is provided between the first magnetic layer 103 and the second magnetic layer 104, and is made of a non-magnetic material such as Ru. The non-magnetic layer 105 causes magnetic exchange coupling between the first magnetic layer 103 and the second magnetic layer 104.

By the magnetic exchange coupling, the directions of magnetization of the first magnetic layer 103 and the second magnetic layer 104 are opposed to each other (antiparallel), and the first magnetic layer 103 and the second magnetic layer 104 are strongly coupled (hereinafter, referred to as antiparallel coupling). The antiparallel coupling between the first magnetic layer 103 and the second magnetic layer 104 cancels the stray field of the first magnetic layer 103. Since the magnetization of the first magnetic layer 103 and the second magnetic layer 104 must be antiparallel, the coercivity of the second magnetic layer 104 is designed to be smaller than the strength of the antiparallel coupling magnetic field between the first magnetic layer 103 and the second magnetic layer 104. The antiparallel coupling magnetic field indicates the strength of the antiparallel coupling between the first magnetic layer 103 and the second magnetic layer 104.

Figure 2:
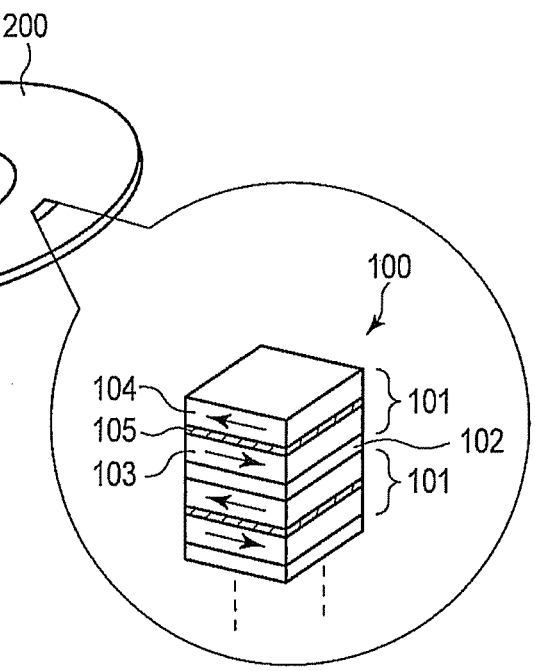
FIG. 2 illustrates an example of usage of the magnetic medium.

FIG. 2 illustrates an example of usage of the magnetic medium 100.

As shown in FIG. 2, the magnetic medium 100 according to this embodiment is used in a circular multilayer disk 200 such as a hard disk drive (HDD). When two or more recording layers 101 are adopted, characteristics affecting the ferromagnetic resonance frequency, such as magnetic anisotropy and saturation magnetization are differentiated for each layer by changing the composition of the first magnetic layer 103 or those of both first magnetic layer 103 and second magnetic layer 104. By doing so, the layers have different ferromagnetic resonance frequencies. Higher ferromagnetic resonance frequencies may be set from the upper layer to the lower layer of the multilayer disk 200, or from the lower layer to the upper layer.

A method for writing data item to the magnetic medium 100 according to the present embodiment will be explained with reference to FIGS. 3A, 3B and 3C.

Figure 3A:
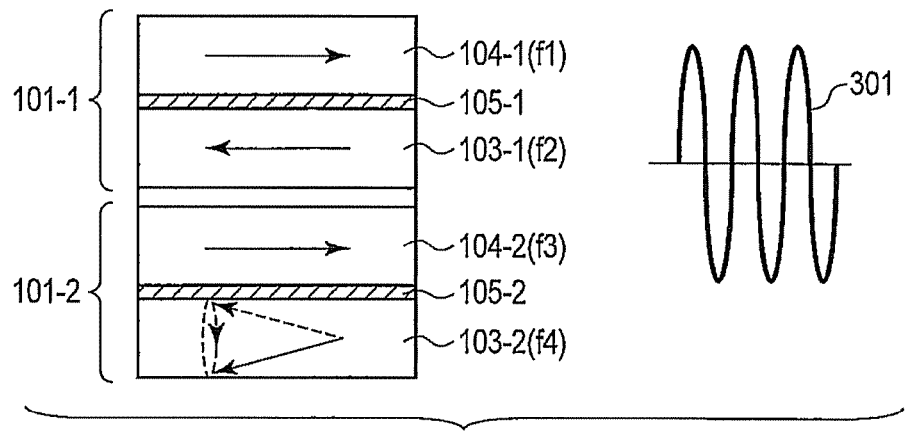
FIGS. 3A, 3B and 3C illustrate a method for writing data item to the magnetic medium.

As shown in FIG. 3A, a high-frequency magnetic field 301 is first applied orthogonally to the direction of magnetization of the recording layer 101. The high-frequency magnetic field 301 is set to be equal to the ferromagnetic resonance frequency of the recording layer to which data is written. In FIG. 3A, the frequency of the high-frequency magnetic field 301 is set to be equal to the ferromagnetic resonance frequency (f4) of the first magnetic layer 103-2 of the recording layer 101-2 to which data is written. When the high-frequency magnetic field 301 is applied, ferromagnetic resonance occurs, and the magnetization of the first magnetic layer 103-2 starts to precess.

Figure 3B:
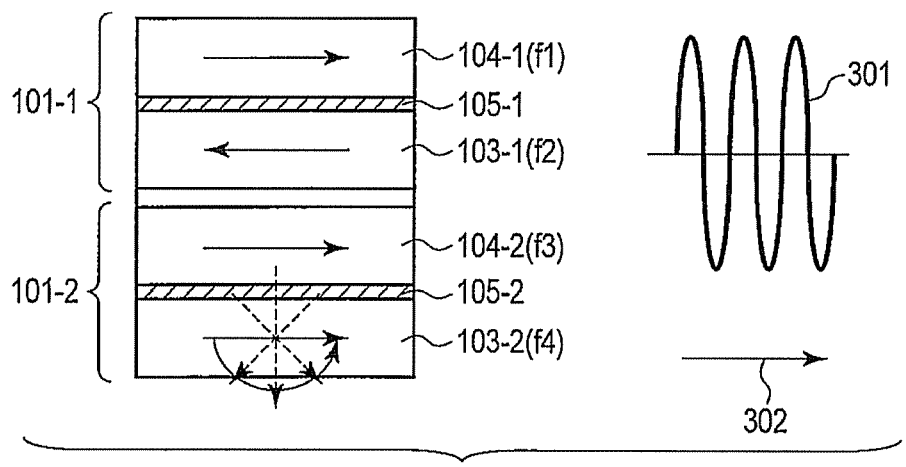

Next, as shown in FIG. 3B, a writing magnetic field (H1) 302 to write binary data (1 or 0) is applied opposed to the direction of magnetization of the first magnetic layer 103-2 before ferromagnetic resonance occurs. Since the magnetization of the first magnetic layer 103-2 has deviated from the easy axis caused by the ferromagnetic resonance, the magnetization is reversed by a writing magnetic field lower than the coercivity of the first magnetic layer 103-2. Since the strength of the writing magnetic field (H1) 302 is smaller than the coercivity of the first magnetic layer 103-1 of the recording layer 101-1 to which no data is written, the magnetization of the first magnetic layer 103 is not reversed. In FIG. 3B, the direction of magnetization of the first magnetic layer 103-2 is the same as that of the second magnetic layer 104-2. Since the antiparallel coupling between the first magnetic layer 103-2 and the second magnetic layer 104-2 prevents reversal of magnetization of the first magnetic layer 103-2, a small antiparallel coupling magnetic field is desired. For example, if the strength of the antiparallel coupling magnetic field is equal to or smaller than several hundreds of oersteds (Oe) which is smaller than the writing magnetic field 302, antiparallel coupling hardly affects the reversal of magnetization of the first magnetic layer 103-2.

Figure 3C:
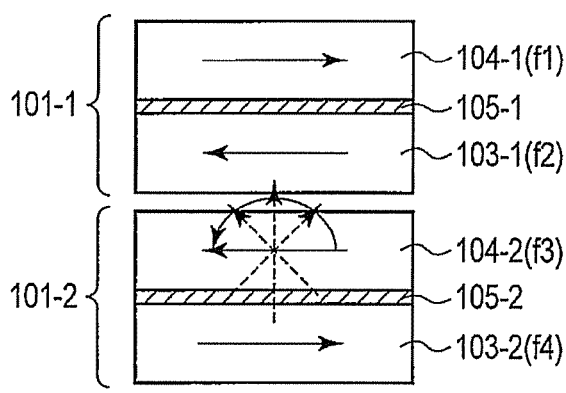

Finally, as shown in FIG. 3C, applying of the high-frequency magnetic field 301 and the write magnetic field (H1) 302 to the first magnetic layer 103-2 is stopped. After stop applying the magnetic fields, the magnetizations of the first magnetic layer 103-2 and the second magnetic layer 104-2 becomes antiparallel because of antiparallel coupling between the first magnetic layer 103-2 and the second magnetic layer 104-2. In FIG. 3B, the direction of magnetization of the second magnetic layer 104-2 which has been the same as that of the first magnetic layer 103-2 is reversed as shown in FIG. 3C since the coercivity of the second magnetic layer 104-2 is smaller than the strength of antiparallel coupling magnetic field.

The reversal of magnetization of the recording layer 101-2 is completed by the above steps. Data item can be written by applying the similar process to each recording layer. As stated above, the stray field can be suppressed by setting the magnetizations of the first magnetic layer 103 and the second magnetic layer 104 in the recording layer 101 to be antiparallel, and the effect of stray field on the ferromagnetic resonance frequency can be suppressed.

A method for reading recorded data item from the magnetic medium 100 will be explained with reference to FIG. 4.

A high-frequency magnetic field 401 is applied orthogonally to the direction of magnetization of the magnetic layer 103-2 of the recording layer 101-2 from which data item is read, and an external magnetic field (H2) is applied parallel to the direction of magnetization of the magnetic layer 103-2. The frequency of the high-frequency magnetic field 401 is set to be equal to the ferromagnetic resonance frequency (f4') of the magnetic layer 103-2 when the external magnetic field (H2) 402 is applied parallel to the direction of magnetization of the magnetic layer 103-2 of the recording layer 101-2 from which data is read. The ferromagnetic resonance frequency, f4', is given by $$f' = \frac{\gamma}{2\pi}\sqrt{(h_a + H2)(h_a + H2 + 4\pi M)}. \quad (2)$$

The external magnetic field (H2) 402 is controlled to be smaller than the coercivity of the first magnetic layer 103 and the antiparallel coupling magnetic field between the first magnetic layer 103 and the second magnetic layer 104 in order to avoid reversal in each magnetic layer.

Figure 4A:
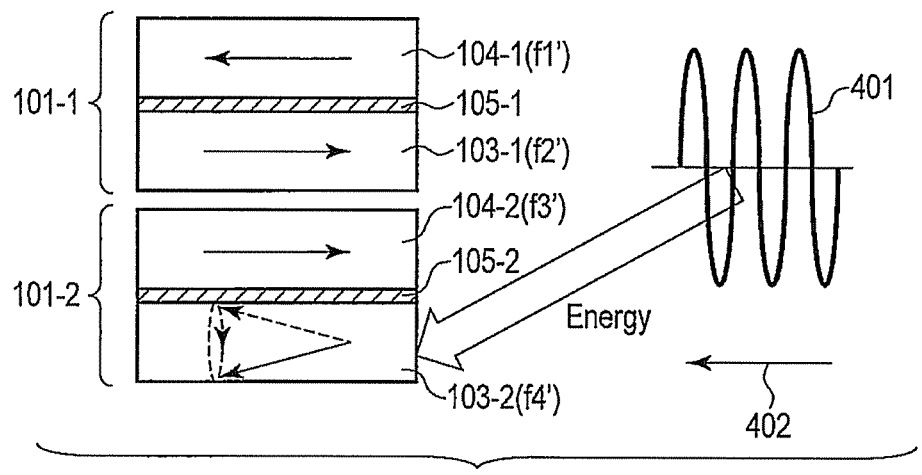
FIGS. 4A and 4B illustrate a method for reading data item from the magnetic medium.
Figure 4B:
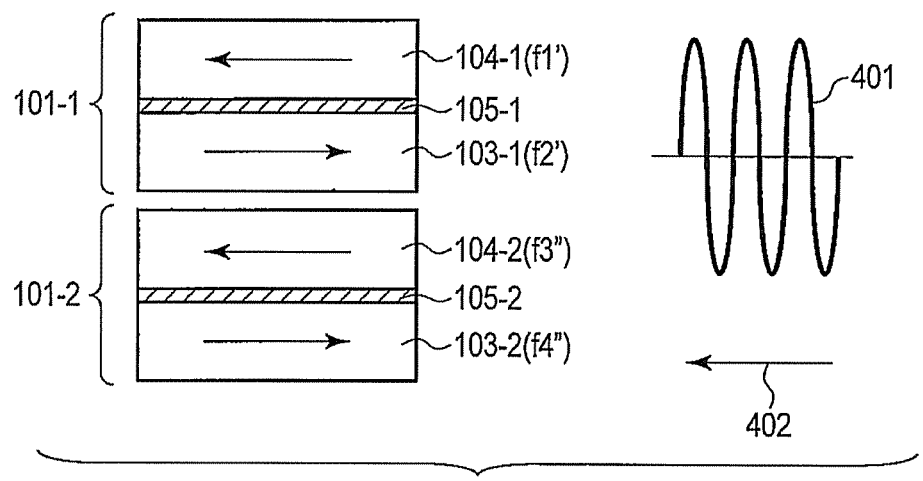

When the direction of magnetization of the magnetic layer 103-2 is the same as the direction of the external magnetic field (H2) 402, i.e., the relative angle between the directions of magnetization of the magnetic layer 103-2 and the external magnetic field (H2) 402 is around zero, the frequency of the high-frequency magnetic field 401 is equal to the ferromagnetic resonance frequency of the magnetic layer 103-2, as shown in FIG. 4A. In this case, ferromagnetic resonance occurs in the magnetic layer 103-2, and the magnetic layer 103-2 absorbs energy. On the other hand, when the direction of magnetization of the magnetic layer 103-2 is opposed to the direction of the external magnetic field (H2) 402, i.e., the relative angle between the directions of magnetization of the magnetic layer 103-2 and the external magnetic field (H2) 402 is around 180°, the frequency of the high-frequency magnetic field 401 is different from the ferromagnetic resonance frequency of the magnetic layer 103-2, as shown in FIG. 4B. In this case, ferromagnetic resonance does not occur in the magnetic layer 103-2, and the magnetic layer 103-2 does not absorb energy. The ferromagnetic resonance frequency, f4", is given by $$f'' = \frac{\gamma}{2\pi}\sqrt{(h_a + H2)(h_a + H2 + 4\pi M)}. \quad (3)$$

Whether or not energy is absorbed is judged by using a conventional method such as the output change of a spin-torque oscillator when a high-frequency magnetic field is applied to the magnetic medium by the spin-torque oscillator. The detailed explanation is omitted. As stated above, the direction of magnetization of the magnetic layer 103-2 of the recording layer 101-2 from which data item is read can be detected based on whether or not energy is absorbed from the high-frequency magnetic field in accordance with the relative angle between the directions of magnetization of the magnetic layer 103-2 and the external magnetic field (H2) 402.

Data item can be read by using ferromagnetic resonance of the second magnetic layer 104 instead of ferromagnetic resonance of the first magnetic layer 103. The recording layer from which data item is read can be selected by differentiating ferromagnetic resonance frequencies of the second magnetic layer 104 of each recording layer.

EXAMPLES

An example of fabricating one dot of a bit-patterned medium (BPM) having two recording layers will be illustrated below, and the layered structure of a magnetic medium with conventional recording layers and that of a magnetic medium with recording layers according to the present embodiment will be compared.

First, an example of fabricating one dot of the conventional BPM will be explained with reference to FIG. 5. A magnetic layered film deposited on a substrate by the sputtering process is patterned into a plurality of one-bit regions (100 nm×50 nm) by lithography.

A layered structure 500 shown in FIG. 5 includes a magnetic medium 501, an insulating layer 502, a magnetization fixed layer 503, an upper electrode 504-1, a lower electrode 504-2 and a substrate 505. The lower electrode 504-2, the magnetization fixed layer 503, the insulating layer 502, the magnetic medium 501 and the upper electrode 504-1 are deposited in order on the substrate 505. The magnetic medium 501 includes recording layers 506-1 and 506-2 and an intermediate layer 507. The magnetization fixed layer 503 is a multilayered structure including an Ir—Mn layer 508, a Co—Fe layer 509, an Ru layer 510 and a Co—Fe—B layer 511.

In FIG. 5, the insulating layer 502, the magnetization fixed layer 503, the upper electrode 504-1 and the lower electrode 504-2 are deposited in order to detect the effect of stray field of the recording layer 506-1 on the ferromagnetic resonance frequency of the recording layer 506-2.

The insulating layer 502 is made of an insulator, for example, MgO, and the thickness is 1 nm. The upper electrode 504-1 is made of Au, and the lower electrode 504-2 is made of Cu. The substrate 505 may be a glass substrate.

The recording layers 506-1 and 506-2 are made of Co alloy having different compositions. The intermediate layer 507 is made of Cu. The thickness of each of the recording layers 506-1 and 506-2 and the intermediate layer 507 is 5 nm.

The Ir—Mn layer 508 is an antiferromagnetic material, and the Ir—Mn layer 508 and the Co—Fe layer 509 are coupled by exchange bias coupling. As shown in FIG. 5, the Co—Fe layer 509 and the Co—Fe—B layer 511 are antiparallel coupled via the Ru layer 510. With this structure, the direction of magnetization of the Co—Fe—B layer 511 of the magnetization fixed layer 503 is fixed, and the effect of stray field from the magnetization fixed layer 503 can be prevented.

The Co—Fe—B layer 511, the recording layer 506-2 and the insulating layer 502 constitute a magnetic tunnel junction. The ferromagnetic resonance of the recording layer 506-2 is measured by measuring a noise spectrum of magnetization variation of the thermally excited recording layer 506-2 by using the tunnel magnetoresistive (TMR) effect. The direction of magnetization of the Co—Fe—B layer 511 of the magnetization fixed layer 503 is expected to be orthogonal to the direction of magnetization of the recording layer 506 in order to increase sensitivity of TMR effect (in FIG. 5, perpendicular to the plane of the paper).

The ferromagnetic resonance result of the multilayered structure shown in FIG. 5 will be explained with reference to FIG. 6.

Figure 6:
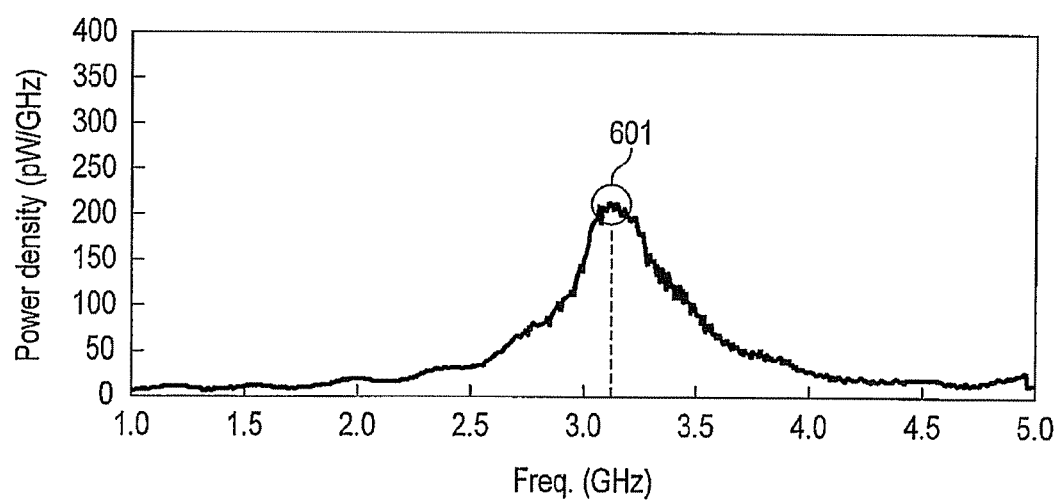
FIG. 6 illustrates measurement results of noise spectrum of the recording layer for one dot of the bit-patterned medium shown in FIG. 5.

When the directions of magnetization of the recording layers 506-1 and 506-2 are parallel as shown in FIG. 5, the noise spectrum of the multilayered structure 500 measured by a spectrum analyzer as show in FIG. 6 can be obtained. According to peak 601, the ferromagnetic resonance frequency is considered to be around 3.15 GHz.

Since the magnetization of the Co—Fe—B layer 511 of the magnetization fixed layer 503 is fixed by the Ir—Mn layer 508 which is an antiferromagnetic layer, thermal fluctuation can be ignored. The recording layers 506-1 and 506-2 form a giant magnetoresistive (GMR) effect element via the intermediate layer 507. However, since the change in resistance by the GMR effect is very much smaller than that by the TMR effect, the observed peak can be considered as a ferromagnetic resonance signal by the thermal fluctuation of the recording layer 506-2.

When the magnetization of the recording layer 506-1 is reversed, and the directions of magnetization of the recording layers 506-1 and 506-2 are set to be antiparallel, the estimated ferromagnetic resonance frequency of the recording layer 506-2 based on the noise spectrum is about 5.5 GHz.

When the directions of magnetization of the recording layers 506-1 and 506-2 are set to be parallel, the stray field from the recording layer 506-1 applied to the recording layer 506-2 is antiparallel to the direction of magnetization of the recording layer 506-2. On the other hand, when the directions of magnetization of the recording layers 506-1 and 506-2 are set to be antiparallel, the stray field from the recording layer 506-1 applied to the recording layer 506-2 is parallel to the direction of magnetization of the recording layer 506-2. As can be seen from the Kittel formula, the ferromagnetic resonance frequency of the magnetic medium changes because of the stray field.

The layered structure utilizing the magnetic medium 100 according to the present embodiment will be explained with reference to FIG. 7.

Figure 7:
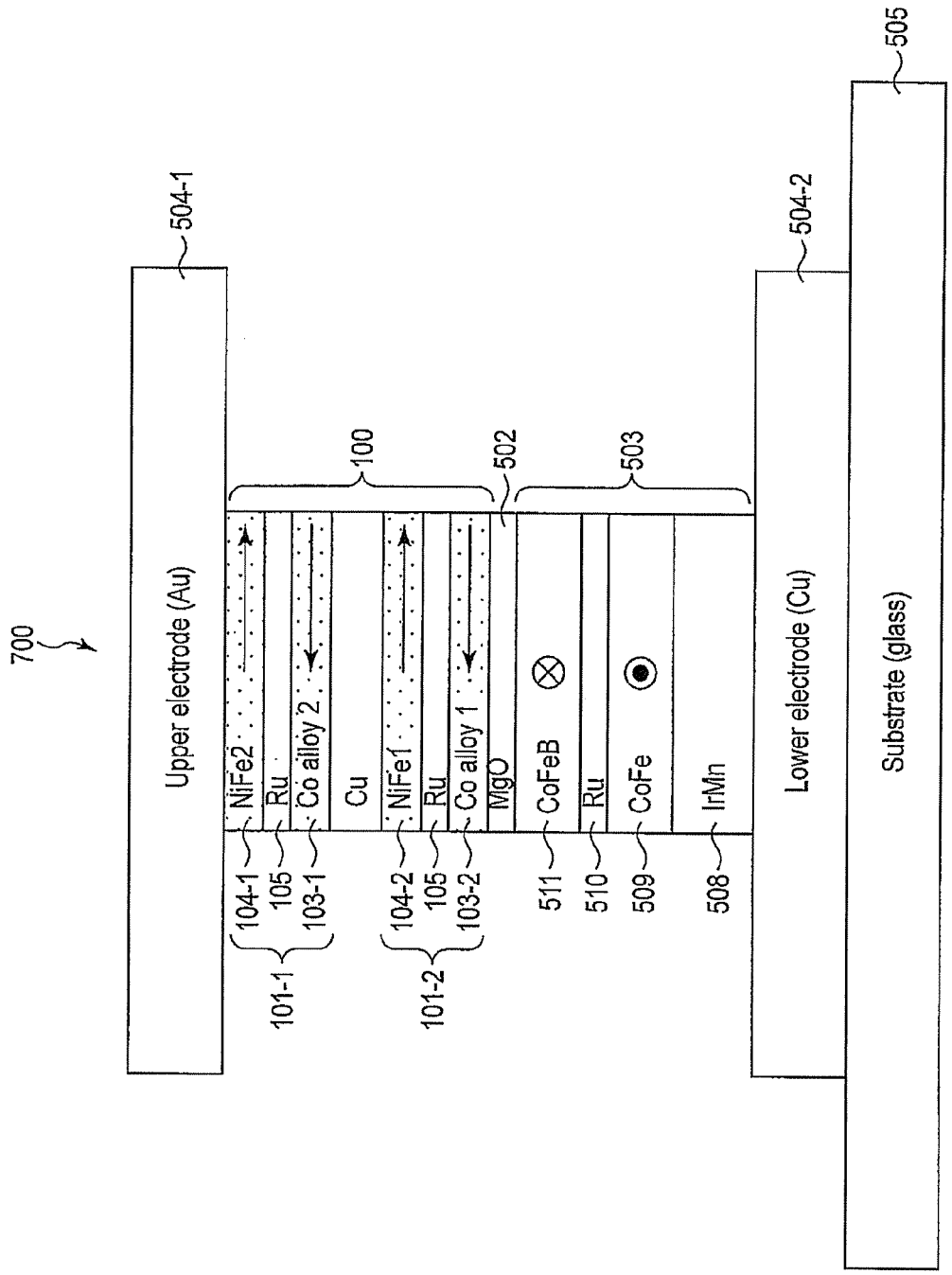
FIG. 7 illustrates examples of one dot of a bit-patterned medium (BPM) having the recording layer according to the present embodiment and an element including a magnetic tunnel junction for measuring a ferromagnetic resonance frequency of the dot.

The fabricating method of the layered structure 700 shown in FIG. 7 is the same as that of the layered structure 500 shown in FIG. 5. The structure of the layered structure 700 is the same as that of the layered structure 500 except that the recording layers of the magnetic medium 100 according to the present embodiment are adopted. In FIG. 7, the recording layer 101-1 including the first magnetic layer 103-1 and the second magnetic layer 104-1 that exhibit antiparallel coupling, the intermediate layer 102, and the recording layer 101-2 including the first magnetic layer 103-2 and the second magnetic layer 104-2 are deposited in order given. The first magnetic layer 103 is a Co alloy layer, and the second magnetic layer 104 is a NiFe layer, both layers having a thickness of 3 nm.

The noise spectrum of the layered structure 700 is measured in the same way as for the layered structure 500 shown in FIG. 5. Based on the measurement results, it is found that the ferromagnetic resonance frequency of the recording layer 101-2 is maintained to be around 4.5 GHz regardless of whether or not the magnetization of the recording layer 101-1 is reversed. This is because the stray field from the recording layer 101-1 was suppressed by the effect from the magnetic materials of the first magnetic layer 103-1 and the second magnetic layer 104-1 that exhibit antiparallel coupling.

With the magnetic medium according to the present embodiment, antiparallel coupling between the first and second magnetic layers in the recording layer suppresses the stray field. This realizes stable writing and reading of the selected recording layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic medium comprising at least one recording layer, the recording layer comprising:
   a first magnetic layer made of a first magnetic material having a first magnetic anisotropy, data item being written to the first magnetic layer in accordance with the magnetization direction;
   a second magnetic layer made of a second magnetic material having a second magnetic anisotropy smaller than the first magnetic anisotropy, wherein coercivity of the second magnetic layer is smaller than a strength of a magnetic field of antiparallel coupling between the first magnetic layer and the second magnetic layer; and
   a non-magnetic layer made of a non-magnetic material and being between the first magnetic layer and the second magnetic layer, the first magnetic layer and the second magnetic layer being coupled such that directions of magnetization of the first magnetic layer and the second magnetic layer are opposed to each other by magnetic exchange via the non-magnetic layer.

2. The medium according to claim 1, wherein the first magnetic layer has a first ferromagnetic resonance frequency and the second magnetic layer has a second ferromagnetic resonance frequency, the first ferromagnetic resonance frequency is different from the second ferromagnetic resonance frequency.

3. The medium according to claim 2, wherein the data item is written to the first magnetic layer by applying a first high-frequency magnetic field and a write magnetic field, the first high-frequency magnetic field having a frequency equal to the first ferromagnetic resonance frequency, the write magnetic field being smaller than coercivity of the first magnetic layer.

4. The medium according to claim 1, wherein the data item written to the first magnetic layer is read, by applying an external magnetic field and a second high-frequency magnetic field to the first magnetic layer and the second magnetic layer, the external magnetic field having a strength not enough to cause magnetic reversal in the first magnetic layer and the second magnetic layer, ferromagnetic resonance frequency of the second high-frequency magnetic field being determined by the relative angle between a direction of the external magnetic field and a direction of magnetization of one of the first magnetic layer and the second magnetic layer.

5. The medium according to claim 1, wherein a plurality of the recording layers are stacked.

6. The medium according to claim 5, wherein the first magnetic layer of each recording layer has a different ferromagnetic resonance frequency each other.

7. The medium according to claim 5, wherein the second magnetic layer of each recording layer has a different ferromagnetic resonance frequency each other.

8. A magnetic writing and reading method comprising:
   applying, to a first magnetic layer of a first recording layer of a plurality of recording layers, a first high-frequency magnetic field and a writing magnetic field in order to write a data item in the magnetic medium according to claim 6, the first high-frequency magnetic field having a frequency equal to the ferromagnetic resonance frequency of the first magnetic layer, the writing magnetic field being smaller than coercivity of the first magnetic layer; and applying, to the first magnetic layer of the first recording layer from which the data item is read, a second high-frequency magnetic field and an external magnetic field, the external magnetic field having a strength that fails to cause magnetic reversal in the first magnetic layer and a second magnetic layer of the first recording layer, and reading the data item based on a ferromagnetic resonance frequency changing in accordance with a relative angle between a direction of magnetization of the first magnetic layer and a direction of the external magnetic field.

9. A magnetic reading method comprising:

applying, to a second magnetic layer of a first recording layer, a high-frequency magnetic field and an external magnetic field, the first recording layer being written a data item and being included in the magnetic medium according to claim 7, the external magnetic field having a strength that fails to cause magnetic reversal in the second magnetic layer; and reading the data item based on a ferromagnetic resonance frequency changing in accordance with a relative angle between a direction of magnetization of the second magnetic layer and a direction of the external magnetic field.

* * * * *